Nov. 14, 1950     W. R. RATHKAMP     2,530,178
FLUXMETER
Filed June 3, 1948
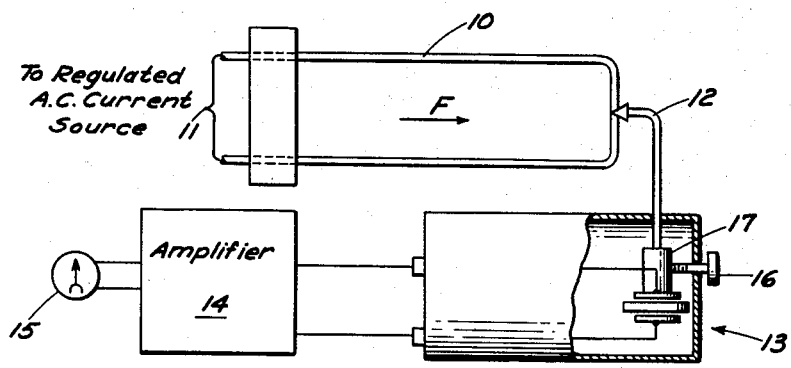
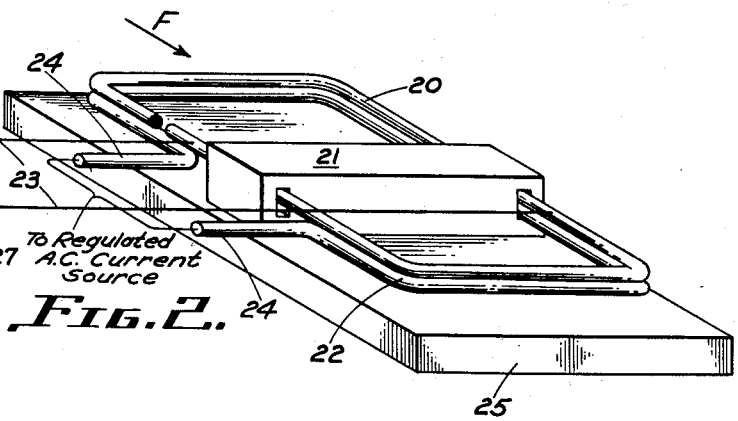
INVENTOR.
William R. Rathkamp
BY
Roland A. Anderson
ATTORNEY

UNITED STATES PATENT OFFICE 2,530,178

FLUXMETER

William R. Rathkamp, Oak Ridge, Tenn., assignor, by mesne assignments, to the United States of America as represented by the United States Atomic Energy Commission Application June 3, 1948, Serial No. 30,830

2 Claims. (Cl. 175—183)

This invention relates to a device for measuring magnetic flux, that is, a fluxmeter. Devices of this type for indicating magnetic field strength ordinarily are used in connection with the maintenance of magnets and magnetic fields such as are employed for example, in the operation of the electro magnetic type of isotopic mass separators. In the past several types of devices have been used for indicating the strength of the magnetic field. These devices typically involve a coiled wire disposed in the magnetic field, the coil being rotated so that an E. M. F. is developed in the coil proportional to the field strength. The field strength was then determined simply by measuring the magnitude of the developed E. M. F.

My invention provides an effective fluxmeter of simpler construction than has heretofore been known, it being simpler particularly in that it eliminates all rotating parts. The substance of the invention, as will appear hereinafter more in detail, involves the disposition in the magnetic field of an element having such characteristics that the element will vibrate in the field with a pre-determined amplitude proportional to the field strength. The substance of the invention further includes in combination with the vibrating element, a device to measure the amplitude of the vibration which as stated will be directly proportional to the strength of the magnetic field.

In accordance with the foregoing, an object of my invention is to provide an extremely simple and rugged fluxmeter having no rotating parts.

Another object of my invention is to provide a fluxmeter comprising an element disposed in a magnetic field and having such characteristics that it will vibrate with an amplitude which is directly proportional to the strength of the magnetic field and which vibration is measurable to thereby determine the strength of the magnetic field.

Another object of my invention is to provide a fluxmeter comprising a looped conductor element carrying a substantially constant pulsating current disposed in the magnetic field so as to cause the element to vibrate with a frequency equal to that of the current in the element and with an amplitude proportional to the strength of the magnetic field, the amplitude of the vibration being measurable to determine the strength of the field.

Another object is to provide a fluxmeter as in the foregoing object wherein a device is provided in combination with the conductor element so as to be vibrated thereby and to set up an indicating signal proportional to the amplitude of the vibration.

Another object of the invention is to provide a fluxmeter as in the two preceding objects wherein the vibration measuring device is in the form of a crystal pick-up having its pick-up element resting on the conductor element whereby a voltage is generated across the crystal proportional to the amplitude of the vibration.

Another object of the invention is to provide a fluxmeter as in the preceding objects wherein the vibration measuring device is in the form of a coil of wire positioned to be vibrated by the looped conductor element so that a voltage or E. M. F. is developed in the coil proportional to the amplitude of the vibration.

Further objects and numerous of the advantages of my invention will become apparent from the following detailed description wherein Figure 1 of the drawing is representative of a preferred form of the invention utilizing the crystal pick-up vibration detecting device.

Figure 2 is a representation of a second preferred form of the invention utilizing a coil of wire as the detector for the amplitude of the vibration.

In its broadest aspects, my invention comprises the combination of a resilient conductor disposed parallel to the direction of the magnetic flux, having a fixed support providing a vibrational node, and supplied with pulsating current of fixed frequency and amplitude, thereby adapted to vibrate in the magnetic field with the frequency of said pulsating current and with an amplitude proportional to the magnetic flux, together with a suitable device for measuring the amplitude of vibration of said conductor.

The resilient conductor may be of any suitable form adapted for ready vibration, such as a single resilient conductor with one or more flexible leads to supply the pulsating current, a single resilient loop, or a multiple-turn coil of resilient construction. A loop or coil should, of course, be disposed with the plane of the winding parallel to the magnetic field. The resilient conductor, of whatever form employed, is positioned by at least one fixed support to provide a vibrational node. The preferred vibrating conductor for use in my present invention comprises a single-turn resilient loop having a single fixed support at one end thereof, or at the middle.

The pulsating current supplied to the resilient conductor may be pulsating direct current, or alternating current of half-wave, full-wave, single-phase or multiple-phase character. Preferably, however, full-wave single-phase alternating current is employed. The frequency of the current may be chosen within a wide range, but should not, of course, be sufficiently high for the inertia of the coil to prevent responsive vibration. It is also desirable to avoid frequencies corresponding to the fundamental, or harmonics, of the natural resonant frequency of the conductor for mechanical vibration. A standard power line frequency, such as 60 cycles per second, is generally entirely satisfactory and is preferred for use in my invention.

Any suitable device may be employed for measuring the amplitude of vibration of the resilient conductor. Devices for measuring vibrational amplitudes are known in the prior art and are not considered to be inventive herein, apart from their combination with other elements of my invention, as described, and as set forth in the appended claims.

The amplitude of vibration of the resilient conductor may be sensed by optical, electrical, or mechanical means, or by means of sonic or supersonic waves produced by the vibrating element. For simplicity, it is preferred to sense the amplitude of vibration by mechanical contact with the vibrating element, and to translate a portion of the vibrational energy into an electrical signal which may be suitably amplified and metered. Any of the common piezo-electric or magneto-electric translating devices may be employed for this purpose.

A single piezo-electric crystal of the proper resonant frequency may be employed as the translating device, but it is generally preferred to use a compact mass of small crystals, having a wide frequency response, such as a crystal cartridge of the type employed in phonograph pick-up devices. The piezo-electric crystals may be mechanically coupled to the vibrating conductor in conventional fashion, and the alternating potential developed across the crystals by their resulting vibration may likewise be amplified and metered or recorded by conventional means.

A suitable magneto-electric translating device comprises a multiple-turn coil of wire, mechanically coupled to the vibrating conductor, and disposed within the magnetic field with the plane of its winding parallel to the field. The resulting alternating current generated in the coil or the alternating potential developed across the coil may then be amplified and metered or recorded by conventional means.

One preferred specific embodiment of my present invention is illustrated in Figure 1 of the accompanying drawings. Referring to this figure, there is disclosed one of the embodiments or examples of my invention which is one of the preferred forms of the invention. In this figure numeral 10 designates a loop of wire which is mounted so as to have a vibrational node near one end and so as to be disposed in a plane parallel to the direction of a magnetic field which is indicated by the arrow F. An A. C. voltage indicated by the numeral 11 is applied across the loop 10, the loop thus tending to vibrate across the magnetic field with a frequency equal to that of the applied voltage. The amplitude of the vibration will be proportional to the strength of the magnetic field and thus by measuring the amplitude of the vibration, the strength of the magnetic field will have been ascertained. As previously pointed out, my invention also embraces the combination with the loop 10 of any of various suitable devices which are capable of measuring the amplitude of the vibration and indicating it. One of such devices may take the form of a crystal pick-up having a wire or needle as indicated at 12 which rests on the extremity of the wire loop 10 as shown, so as to vibrate with the vibrations of the loop. Needle 12 is attached to the pick-up crystal which is indicated at 13 and as the needle vibrates, which will be a sine wave vibration of constant frequency, a corresponding voltage will be developed across the crystal of the pick-up, the crystal operating in a manner well known in the art in causing this voltage to be developed thereacross. It is to be understood that the particular representation of Figure 1 is representative not of only one specific form of crystal but of various known types falling in the same class or category and having the same or similar functional characteristics. That is, any device which as a result of mechanical vibration impressed on it tending to compress and release it thereby causing an electromotive force to be developed, could similarly be utilized. The voltage or E. M. F. developed across the crystal will be proportional to the magnetic field and this voltage is amplified by amplifier 14, the crystal being across the input circuit of the amplifier. The output of the amplifier is connected to an indicating voltmeter as indicated at 15 which thus gives a visual indication of the strength of the magnetic field. The needle 12 is replaceable by loosening of the thumb screws 16 in the needle holder 17.

Referring to Figure 2 of the drawing, an embodiment or example of another preferred form of my invention is shown wherein the device for detecting and measuring the amplitude of the vibration is of a slightly different form. In this form of the invention a coil of wire 20 consisting of, for example, 20 turns of fine copper wire inserted in a plastic tubing is placed on the A. C. carrying wire loop 22. Both the wire loop and coil are pivoted, the pivot being formed by the loop and coil extending through suitable openings in a block 21 resting on base 25. A regulated A. C. source is connected through leads 24, 24 to the loop 22.

The loop 22 is oriented so that the direction of the magnetic flux F is at right angles to the axis of the loop. In operation, the loop 22 will tend to vibrate across the field causing the coil 20 to similarly vibrate across the field. Because the coil 20 pivots in the block 21, each half cuts the magnetic field in an opposite direction thus inducing current to flow in the closed loop. The current is proportional to the square of the magnetic field strength. It is taken off by leads 23, 23 and may be amplified and indicated as in Figure 1 by means of amplifier 26 and indicator 27.

From the foregoing it will be observed that while the device in Figure 2 for measuring the amplitude of the vibration is slightly different than that of Figure 1, it has similar essential functional characteristics and represents merely a slightly different way of practicing the invention. In Figure 2 the element 20 is mechanically vibrated just as is the element 12 of Figure 1. This vibration which is a mechanical vibration, results in a generated E. M. F. in the coil 20 in Figure 2, whereas in Figure 1 the mechanical vibration results in the generation of an E. M. F. across the crystal 13.

While two embodiments of my invention have been elucidated and described as preferred forms it is to be understood that the invention may take other forms all of which are intended to come within the spirit and scope of claims appended hereto.

Having thus described my invention, I claim:

1. A device for determining magnetic field strength comprising a pulsating current conducting element forming an armature disposed in the magnetic field and being mounted to allow vibration of the element across the field so that the amplitude of the vibration is proportional to the strength of the magnetic field, and means responsive to vibration of the armature for giving an indication of the field strength comprising a member forming an armature positioned to be mechanically vibrated by the current conducting element so as to cause an E. M. F. to be generated in the member and means for measuring the magnitude of the induced E. M. F.

2. A device for determining magnetic field strength comprising a loop of wire disposed in the magnetic field, the wire carrying a current having a periodic wave form, the loop of wire being so positioned that inter-action with the magnetic field induces vibration of the loop having an amplitude proportional to the strength of the field, and means responsive to vibrations of the loop comprising a coil mounted to be mechanically vibrated by the loop in a manner to cause an E. M. F. to be generated in the coil, the magnitude of which is a measure of the strength of the magnetic field and means for measuring the generated E. M. F.

WILLIAM R. RATHKAMP.

REFERENCES CITED

The following references are of record in the file of this patent:

UNITED STATES PATENTS

| Number | Name | Date |
|---|---|---|
| 1,863,415 | Rieber | June 14, 1932 |
| 2,331,617 | Moore | Oct. 12, 1943 |
| 2,420,580 | Antes | May 13, 1947 |